(12) United States Patent     (10) Patent No.:   US 12,589,926 B2

Peniche     (45) Date of Patent:     Mar. 31, 2026

(54) METHODS OF USING STRAPS FOR AERIAL TRANSPORT OF PACKAGES

(71) Applicant: Signode Industrial Group LLC, Tampa, FL (US)

(72) Inventor: Roger Peniche, Chicago, IL (US)

(73) Assignee: SIGNODE INDUSTRIAL GROUP LLC, Tampa, FL (US)

( * ) Notice: Subject to any disclaimer, the term of this patent is extended or adjusted under 35 U.S.C. 154(b) by 0 days.

(21) Appl. No.: 18/864,511

(22) PCT Filed: May 8, 2023

(86) PCT No.: PCT/US2023/021421

§ 371 (c)(1),
(2) Date: Nov. 8, 2024

(87) PCT Pub. No.: WO2023/219981

PCT Pub. Date: Nov. 16, 2023

(65) Prior Publication Data

US 2025/0326546 A1     Oct. 23, 2025

Related U.S. Application Data

(60) Provisional application No. 63/340,932, filed on May 11, 2022.

(51) Int. Cl.
B65D 63/18     (2006.01)
B64D 9/00     (2006.01)
(Continued)

(52) U.S. Cl.
CPC .............. B65D 63/18 (2013.01); B64D 9/00 (2013.01); B65B 61/14 (2013.01); B65D 25/22 (2013.01)

(58) Field of Classification Search
CPC ... B64D 1/22; B64D 1/12; B64D 1/08; B64D 1/02; B64D 9/00; B64D 25/06;
(Continued)

(56) References Cited

U.S. PATENT DOCUMENTS 799,793 A   *   9/1905   Kinsella .................... A45F 5/10
                                294/155
925,986 A   *   6/1909   Blackburn ................ A45F 5/10
                                294/157

(Continued)

FOREIGN PATENT DOCUMENTS

CN     201698275 U     1/2011
CN     202575194 U     12/2012
(Continued)

OTHER PUBLICATIONS

International Search Report and Written Opinion prepared by the European Patent Office in international application No. PCT/US2023/021421 dated Aug. 24, 2023.

(Continued)

*Primary Examiner* — Arfan Y. Sinaki

(74) *Attorney, Agent, or Firm* — Neal, Gerber & Eisenberg LLP

(57) ABSTRACT

Various embodiments of the present disclosure provide methods of using a strap for supporting and transporting a package via an aerial vehicle.

16 Claims, 8 Drawing Sheets

(51) Int. Cl.
B65B 61/14 (2006.01)
B65D 25/22 (2006.01)

(58) Field of Classification Search
CPC ... B64F 1/32; B64U 2101/64; B64U 2101/66; B66C 1/38; A45F 5/10
USPC ........................................................ 224/250
See application file for complete search history.

(56) References Cited

U.S. PATENT DOCUMENTS

| | | | | |
|---|---|---|---|---|
| 946,850 | A | * | 1/1910 | Tabler ........................ A45F 5/10 294/149 |
| 1,075,997 | A | * | 10/1913 | Thomas .................... A45F 5/10 294/149 |
| 1,971,197 | A | | 8/1934 | Ottinger |
| 2,741,420 | A | | 4/1956 | Bodard |
| 3,220,626 | A | * | 11/1965 | Tupper .................. A47J 45/075 294/157 |
| 3,337,044 | A | * | 8/1967 | Smith .................. B65D 85/671 206/413 |
| 5,110,023 | A | * | 5/1992 | Colin ........................ A45F 3/14 224/901.4 |
| 5,570,787 | A | | 11/1996 | Danovaro et al. |
| 5,806,731 | A | * | 9/1998 | Mark .................... F41C 33/048 2/300 |
| 7,066,347 | B2 | * | 6/2006 | Slovak ................... B65D 25/34 220/754 |
| 10,035,623 | B1 | | 7/2018 | Prager et al. |
| 11,691,731 | B2 | * | 7/2023 | Wong ........................ B64D 1/22 244/137.4 |
| 12,103,682 | B2 | * | 10/2024 | Blake ........................ B64D 1/12 |
| 12,187,432 | B2 | * | 1/2025 | Johnson ................... B64D 1/12 |
| 2009/0014508 | A1 | | 1/2009 | Marie |
| 2015/0246745 | A1 | | 9/2015 | Loftin et al. |
| 2015/0367981 | A1 | | 12/2015 | Moore |
| 2018/0022455 | A1 | * | 1/2018 | McCaslin ................ B64D 1/12 244/137.4 |
| 2018/0281954 | A1 | | 10/2018 | Atchley et al. |
| 2019/0233254 | A1 | | 8/2019 | Shin |
| 2020/0069004 | A1 | * | 3/2020 | Mackay ................. A44B 15/00 |
| 2020/0207471 | A1 | * | 7/2020 | Yasuda .................... B64D 1/22 |
| 2020/0385120 | A1 | | 12/2020 | Bryson et al. |
| 2021/0229811 | A1 | | 7/2021 | Martino et al. |
| 2022/0205469 | A1 | * | 6/2022 | Gil ........................... B66C 1/12 |
| 2022/0232959 | A1 | * | 7/2022 | Aughney ................. A45F 5/10 |
| 2023/0091849 | A1 | * | 3/2023 | Wong ....................... B64D 1/22 244/137.4 |
| 2023/0192295 | A1 | * | 6/2023 | Blake ....................... B64D 1/22 244/137.1 |

FOREIGN PATENT DOCUMENTS

| | | |
|---|---|---|
| CN | 206543016 U | 10/2017 |
| CN | 109353638 A | 2/2019 |
| CN | 209436558 U | 9/2019 |
| CN | 209939334 U | 1/2020 |
| EP | 0754631 A | 1/1997 |
| EP | 3 674 213 A1 | 7/2020 |
| FR | 963 214 A | 7/1950 |
| GB | 191314190 A | 10/1913 |
| WO | 2016054466 A1 | 4/2016 |
| WO | 2022008930 A1 | 1/2022 |

OTHER PUBLICATIONS

Packaging Europe, "How drones are reshaping home deliver", retrieved from internet at https://packagingeurope.com/how-drones-are-reshaping-home-delivery/, Oct. 5, 2021.

Amazon, "Carrying Strap with Handle for Safely Moving and Lifting and Carrying Heavy Boxes, Groceries, Luggage, Non-Slip Adjustable Belt(Cross Style)", retrieved from internet at amazon.com/Carrying-Lifting-Groceries-Non-Slip-Adjustable/dp/B096VLTCDV/ref=sr_1_4?keywords=box%2Bstraps&qid=1642487094&sr=8-4&th=1, Jun. 8, 2021.

* cited by examiner

METHODS OF USING STRAPS FOR AERIAL TRANSPORT OF PACKAGES

This application is a national stage application of PCT/US2023/021421, filed May 8, 2023, which claims priority to and the benefit of U.S. Provisional Patent Application No. 63/340,932, filed May 11, 2022, the entire contents of each of which are incorporated herein by reference.

FIELD

The present disclosure relates to methods of using a strap for supporting and transporting a package via an aerial vehicle.

BACKGROUND

Shipping companies use aerial vehicles, such as drones, to transport and deliver packages. Doing so requires securing the package to the aerial vehicle for flight.

SUMMARY

Various embodiments of the present disclosure provide methods of using a strap for supporting and transporting a package via an aerial vehicle.

In a first example embodiment, a method of applying a strap to a package is described. The method includes wrapping the strap around a perimeter of the package so a first portion of the strap engages a side of the package and a second portion of the strap overlaps the first portion of the strap on the side of the package. The method further includes forming a loop with the second portion of the strap. And the method includes attaching part of the second portion of the strap to part of the first portion of the strap to secure the loop so the loop is configured to be engaged by an aerial vehicle so as to lift the package.

In a second embodiment, a method of transporting a package is described. The method includes wrapping a strap around a perimeter of the package so a first portion of the strap engages a side of the package and a second portion of the strap overlaps the first portion of the strap on the side of the package. The method further includes forming a loop with the second portion of the strap. The method additionally includes attaching part of the second portion of the strap to part of the first portion of the strap to secure the loop so the loop is configured to be engaged by an aerial vehicle so as to lift the package. The method additionally includes lifting the package, via the loop, with an aerial vehicle. And the method includes transporting the package via the aerial vehicle.

In a third embodiment, a device for delivery via an aerial vehicle is described. The device includes a package. The device additionally includes a strap. The strap includes a first portion and a second portion. The strap is wrapped around a perimeter of the package so a first portion of the strap engages a side of the package and a second portion of the strap overlaps the first portion of the strap on the side of the package and forms a loop configured to be engaged by the aerial vehicle so as to lift the package.

DETAILED DESCRIPTION

Various embodiments of the present disclosure provide methods of using straps for aerial transport of a package. More particularly, the present disclosure provides devices and methods for securing a strap to a package. The strap forms a loop engageable by an aerial vehicle, such as a drone. The strap and loop are positioned such that the aerial vehicle can readily engage the loop without manual operator intervention. Additionally, the strap is positioned on the package to improve weight distribution and stability during flight.

Figure 1:
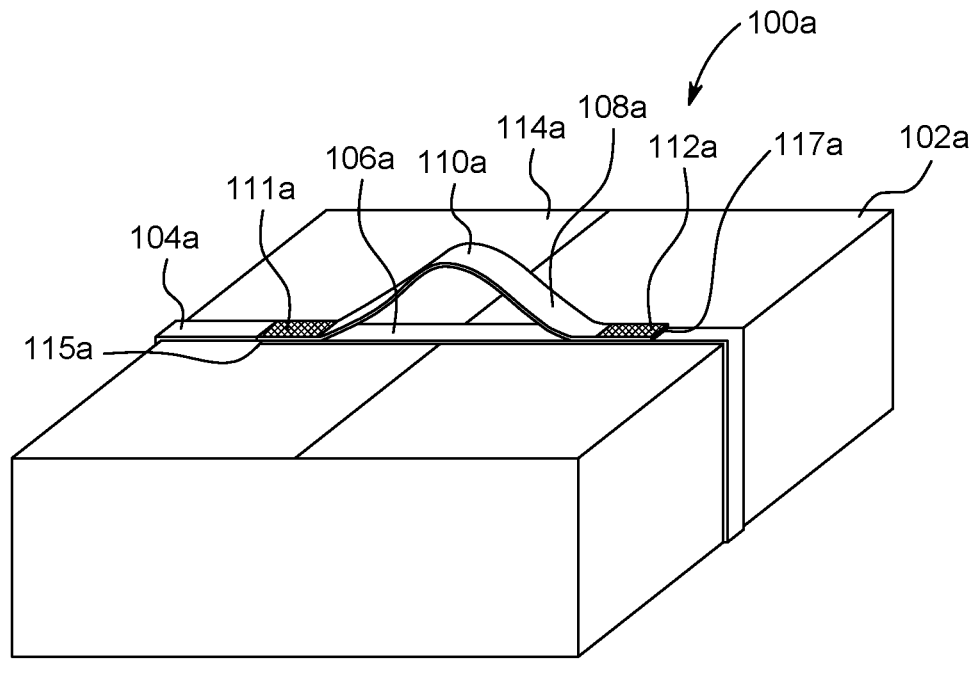
FIG. 1 is a perspective view of an example embodiment of a device for delivery via an aerial vehicle.

FIG. 1 illustrates a first embodiment of a device 100a for delivery via an aerial vehicle. The device 100a includes a package 102a and a strap 104a, the strap 104a being wrapped around a perimeter of the package 102a. The strap 104a includes a first portion 106a and a second portion 108a. The first portion 106a of the strap engages a side 114a of the package 102a. The second portion 108a of the strap 104a overlaps the first portion 106a of the strap 104a on the side 114a of the package 102a and forms a loop 110a. In this embodiment, the first portion 106a of the strap 104a is adjacent to a first end of the strap 104a, and the second portion 108a of the strap 104a is adjacent to a second end of the strap 104a.

Part of the second portion 108a of the strap 104a is attached to part of the first portion 106a of the strap 104a to secure the loop 110a so the loop 110a can be engaged by an aerial vehicle. Namely, the loop 110a is secured so the aerial vehicle can lift the package 102a for transportation. Typically, the overlapping portions of the strap 104a and the loop 110a are positioned on a top side 114a of the package, or a side of the package 102a that faces the aerial vehicle during transportation. In other examples, the loop 110a is positioned on a side of the package that is substantially perpendicular to the aerial vehicle during transportation.

The strap 104a can be formed from any of several different types of materials. For instance, in some examples, the strap 104a is a plastic strap made of polyester or polypropylene. In different examples, the strap 104a is a metal strap made of steel. In various embodiments, the strap 104a is a paper strap made of Kraft paper. The strap 104a can also vary in size. For instance, a width of the strap 104a can range from ⅜ of an inch to 2 inches. And a thickness of the strap can range from 0.015 inches to 0.5 inches. Many other example materials and sizes of the strap 104a are possible.

The material of the strap 104a is shape retaining such that the loop 110a can easily be engaged by an aerial vehicle. In other words, there is a gap between the top of the loop 110a and the portion of the strap 104a engaging the side 114a of the package 102a (e.g., as shown in FIG. 1) without application of a force on the strap 104a. As such, an aerial vehicle can engage the loop 110a without manual operator intervention to lift the loop 110a and position the loop 110a on the aerial vehicle. In other examples, the material of the strap 104a is semi-rigid so that the loop 110a remains in a fixed position or substantially fixed position during engagement by an aerial vehicle or transportation via the aerial vehicle.

Different sizes and materials of the strap affect properties of the strap, such as the tensile strength and stiffness of the strap. As such, different types of strap can be selected for different package characteristics or shipping considerations. Strap type is selected based on various factors of the package or shipping. Package characteristics that may influence strap selection are weight, stability, rigidity, integrity, and sharpness of the edges (e.g., sharp edges may demand heavier strapping or corner protection) of the package.

Shipping considerations that may affect the choice of type of strap include how far the package is shipped, transportation conditions (e.g., predicted weather), and how the package needs to be handled by the shipper, receiver, or aerial vehicle depending on the contents of the package.

In the example embodiment shown in FIG. 1, the second portion 108a of the strap 104a is attached to the first portion 106a of the strap 104a at two spaced-apart attachment areas 111a, 112a. In this example, each attachment area 111a, 112a includes two overlapping pieces of strap 104a. In this example, the first attachment 111a area includes a first end 115a of the strap 104a, and the second attachment area 112a includes a second end 117a of the strap 104a.

The loop 110a extends between the first attachment area 111a and the second attachment area 112a. The loop 110a is spaced apart from the first portion 106a of the strap 104a, as the loop 110a is shape retaining. For example, the loop 110a is curved away from the package 102a. Additionally, the length of the loop 110a is greater than the length of the first portion 106a of the strap 104a between the first attachment area 111a and the second attachment area 112a.

The strap 104a can be applied to the package 102a by a suitable strapping device, such as a handheld strapping tool or a larger strapping machine. A typical strapping machine includes a support surface that supports the load, a strap chute that defines a strap path and circumscribes the support surface, a strapping head that forms the strap loop and is positioned in the strap path, a controller that controls the strapping head to strap the load, and a frame that supports these components. To apply the strap to the load, the strapping head feeds strap (leading strap end first) from a strap supply into and through the strap chute (along the strap path) until the leading strap end returns to the strapping head. While holding the leading strap end, the strapping head retracts the strap to pull the strap out of the strap chute and onto the load and tensions the strap to a designated strap tension. The strapping head then forms the loop, cuts the strap from the strap supply, and secures the loop (not necessarily in that order).

How the strapping device attaches overlapping portions of the strap to one another during depends on the type of strapping device and the type of strap. Certain strapping devices configured for plastic strap (such as polypropylene strap or polyester strap) include friction welders, heated blades, or ultrasonic welders configured to attach the overlapping portions of the strap to one another. Some strapping devices configured for plastic strap or metal strap (such as steel strap) include jaws that mechanically deform (referred to as "crimping" in the strapping industry) or cut notches into (referred to as "notching" in the strapping industry) a seal element positioned around the overlapping portions of the strap to attach them to one another. Other strapping devices configured for metal strap include punches and dies configured to form a set of mechanically interlocking cuts in the overlapping portions of the strap to attach them to one another (referred to in the strapping industry as a "sealless" attachment). In examples, the strap 104a is positioned such that the tension of the strap secures the package 102a shut. In other examples the package 102a can include fasteners for securing the package shut, such as tape or adhesive, and the tension of the strap 104a provides additional force to secure the package 102a shut during aerial flight.

Figure 2A:
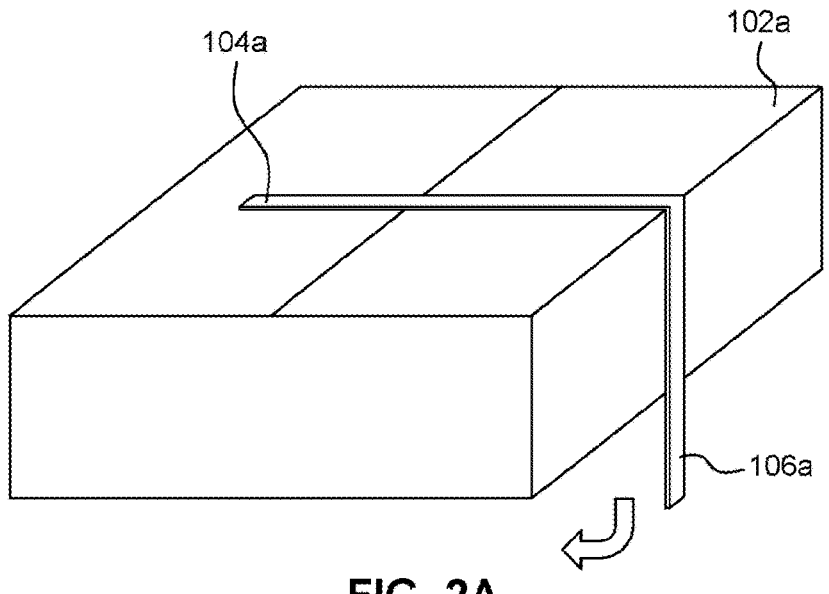
FIG. 2A shows a perspective view of aspects of applying the strap to the package of the device of FIG. 1.
Figure 2B:
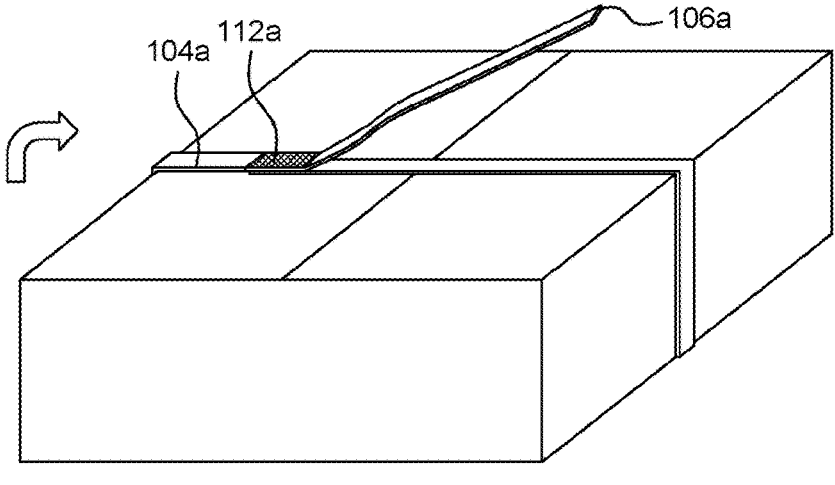
FIG. 2B shows a perspective view of other aspects of applying the strap to the package of the device of FIG. 1.
Figure 2C:
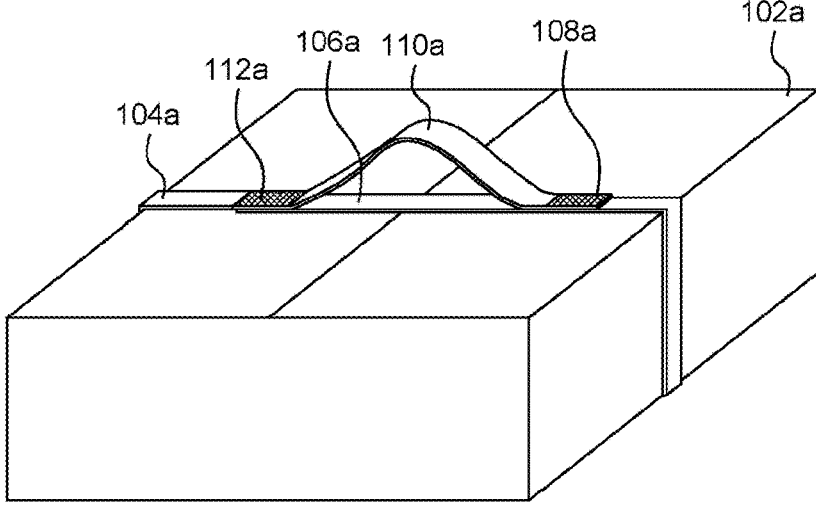
FIG. 2C shows a perspective view of other aspects of applying the strap to the package of the device of FIG. 1.

FIGS. 2A-2C illustrate applying the strap 104a to the package 102a of the device 100a of FIG. 1. Any or all of the steps of applying the strap 104a to the package 102a can be done entirely automatically or could be done partially by an operator.

FIG. 2A shows a perspective view of a first aspect of applying the strap to the package. First, the strap 104A is wrapped around the package 102a so that the second portion 108a overlaps the first portion 106a on the top side 114a of the package 102a.

FIG. 2B shows a perspective view of a second aspect of applying the strap 104a to the package 102a. An operator or automated machine tensions the strap 104a around the package 102a and attaches a first part of the second portion 108a of the package to the first portion 106a of strap 104a at a first attachment area 111a.

FIG. 2C shows another perspective view of a third aspect of applying the strap 104a to the package 102a. An operator or automated machine attaches a second part of the second portion 108a of the strap 104a to the first portion 106a of strap 104a at a first attachment area 112a to form the loop 110a, so that the loop 110a extends between the first attachment area 111a and the second attachment area 112a. The loop 110a is spaced apart from the first portion 106a of the strap 104a, as the loop 110a is shape retaining. The length of the loop 110a is greater than the length of the first portion 106a of the strap 104a between the first attachment area 111a and the second attachment area 112a.

Figure 3:
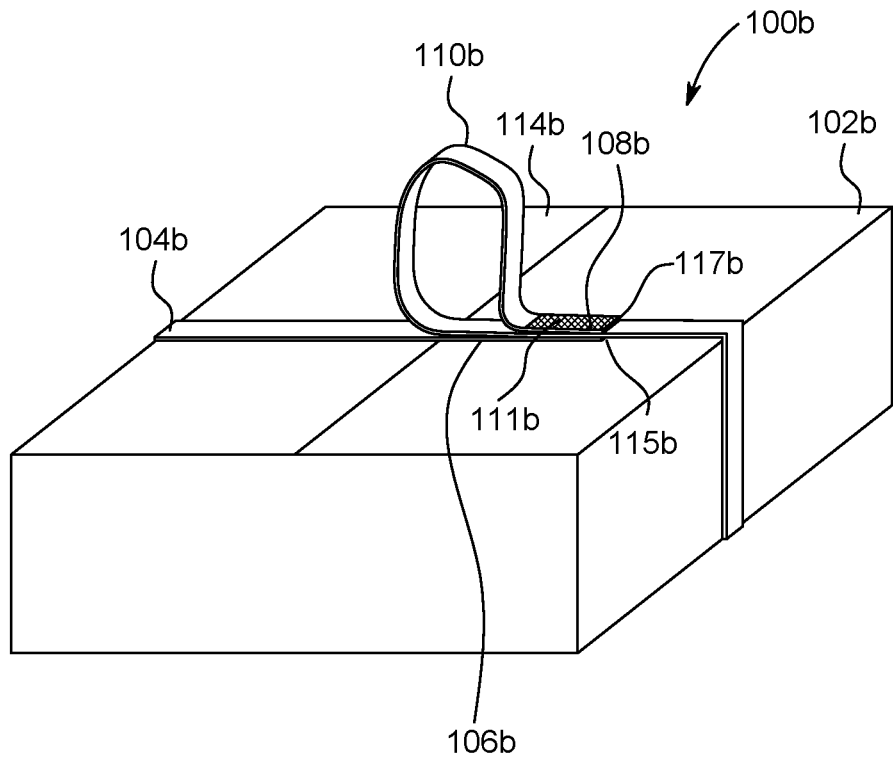
FIG. 3 is a perspective view of another example embodiment of a device for delivery via an aerial vehicle.

FIG. 3 illustrates a second embodiment of a device 100b for delivery via an aerial vehicle. Similar to example device 100a, example device 100b includes a package 102b and a strap 104b, the strap 104b being wrapped around a perimeter of the package 102b. The strap 104b includes a first portion 106b and a second portion 108b. The first portion 106b of the strap 104b engages a side 114b of the package 102b. And the second portion 108b of the strap 104b overlaps the first portion 106b of the strap 104b on the side 114b of the package 102b to form a loop 110b.

Part of the second portion 108b of the strap 104b is attached to part of the first portion 106b of the strap 104b to secure the loop 110b so the loop 110b can be engaged by an aerial vehicle. Namely, the loop 110b is secure so that the aerial vehicle can lift the package 102b for transportation. Typically, the overlapping portions of the strap 104b and the loop 110b are positioned on a top side 114b of the package, or a side of the package 102b that faces the aerial vehicle during transportation. In other examples, the loop 110*b* is positioned on a side of the package that is substantially perpendicular to the aerial vehicle during transportation.

In the example embodiment shown in FIG. 3, the second portion 108*b* of the strap 104*b* attaches to the first portion 106*b* of the strap 104*b* in one attachment area 111*b* of the strap (as opposed to the two attachment areas 111*a*, 112*a*, as shown in FIG. 1).

Loop 110*b* shown in FIG. 3 is different than loop 110*a* shown in FIG. 1. For example, three overlapping portions of strap are attached at one location to form the loop 110*b*, whereas two overlapping portions of the strap are attached in two different locations to form loop 110*a*. Although the loop 110*b* is different than the loop 110*a*, the same types of strap and sizes for strap 104*a* are utilized for strap 104*b*. Similarly, the same methods of attaching overlapping portions of strap 104*b* and tensioning the strap 104*b* can be utilized, as described with respect to strap 104*a*.

In the example shown in FIG. 3, the second portion 108*b* of the strap 104*b* is attached to the first portion 106*b* of the strap 104*b* at an attachment area 111*b*. In this example, attachment area 111*b* includes three overlapping pieces of strap 104*b*. Namely, the second portion 108*b* of the strap 104*b* has a first part and a second part. The attachment area 111*b* includes the first portion 106*b*, the first part of the second portion 108*b*, and the second part of the second portion 108*b* overlapping and attached to each other. In some examples, the attachment 111*b* area includes a first end 115*b* of the strap 104*b* and a second end 117*b* of the strap 104*b*. The loop 110*b* is spaced apart from the first portion 106*b* of the strap 104*b*, as the loop 110*b* is shape retaining. For example, the loop 110*a* is curved away from the package 102*b*.

Figure 4A:
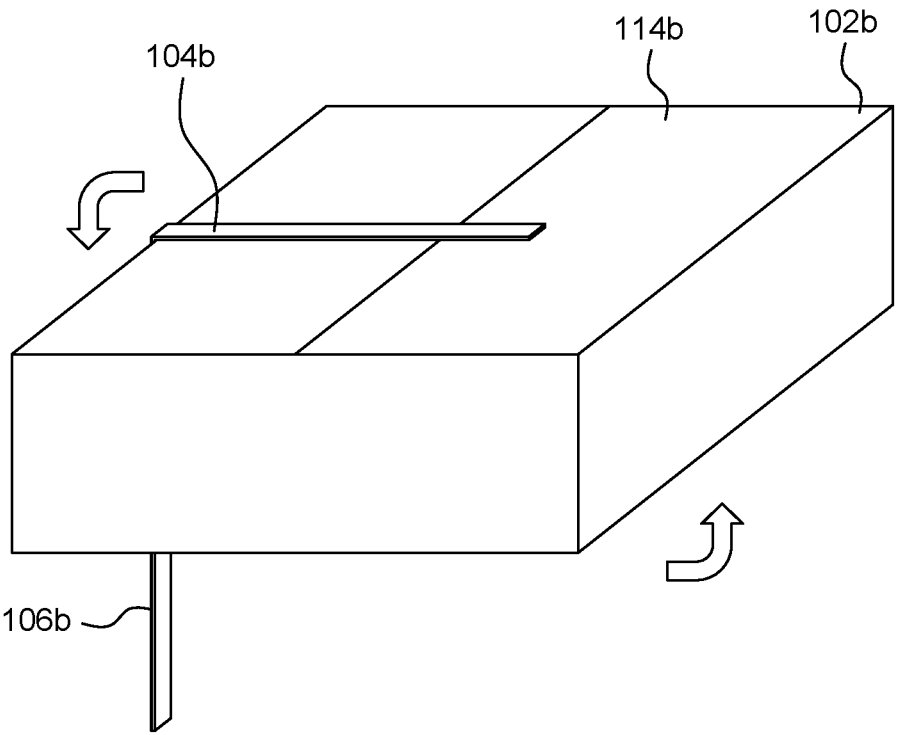
FIG. 4A shows a perspective view of aspects of applying the strap to the package of the device of FIG. 3.
Figure 4B:
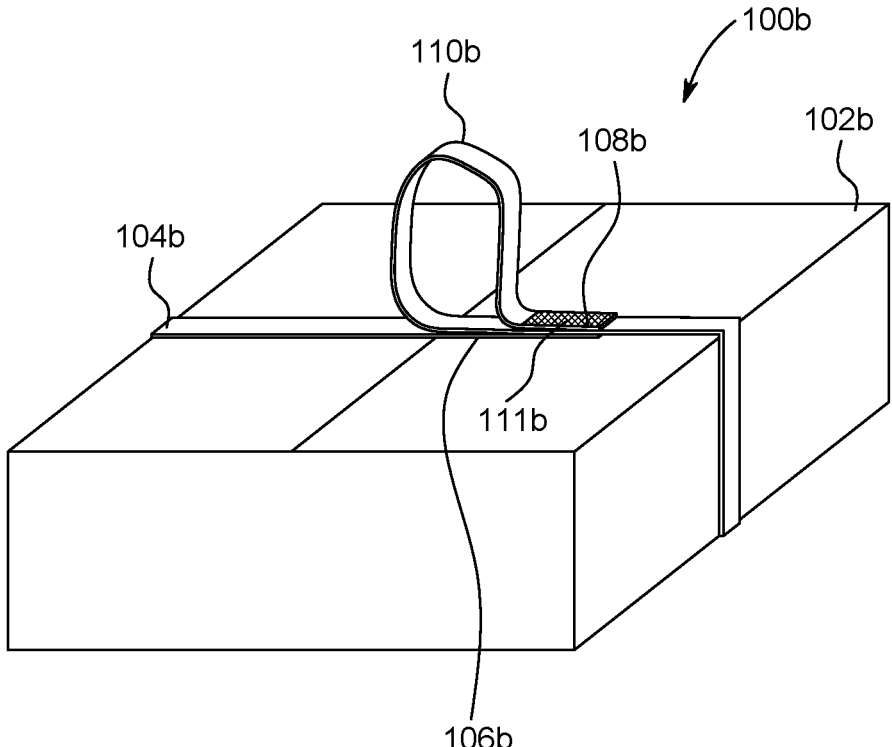
FIG. 4B shows a perspective view of other aspects of applying the strap to the package of the device of FIG. 3.

FIGS. 4A-4B illustrate applying the strap 104*b* to the package 102*b* of the device 100*b* of FIG. 3. Any or all of the steps of applying the strap 104*b* to the package 102*b* can be done entirely automatically or could be done partially by the operator.

FIG. 4A shows a perspective view of a first aspect of applying the strap 104*b* to the package 102*b*. First, an operator or automated machine wraps the strap 104*b* around the package 102*b* so that the second portion 106*b* overlaps the first portion 106*b* on the top side 114*b* of the package 102*b*.

FIG. 4B shows a perspective view of a second aspect of applying the strap 104*b* to the package 102*b*. An operator or automated machine forms the loop 110*b*, tensions the strap 104*b* around the package 102*b*, and attaches the first portion 106*b*, the first part of the second portion 108*b*, and the second part of the second portion 108*b* at the attachment area 111*b*.

Figure 5A:
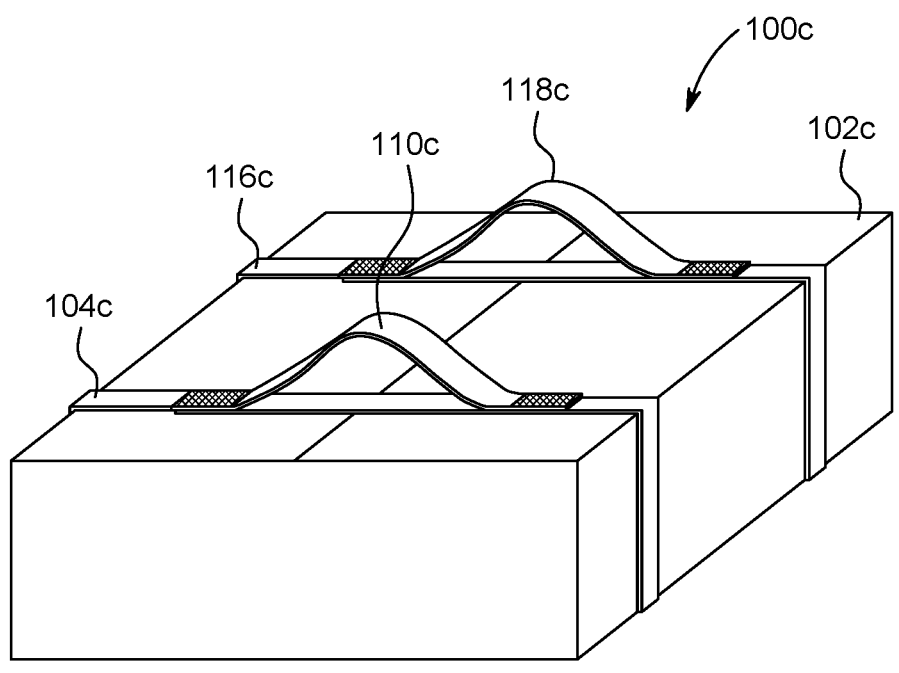
FIG. 5A shows a perspective view of another example embodiment of a device for delivery via an aerial vehicle.
Figure 5B:
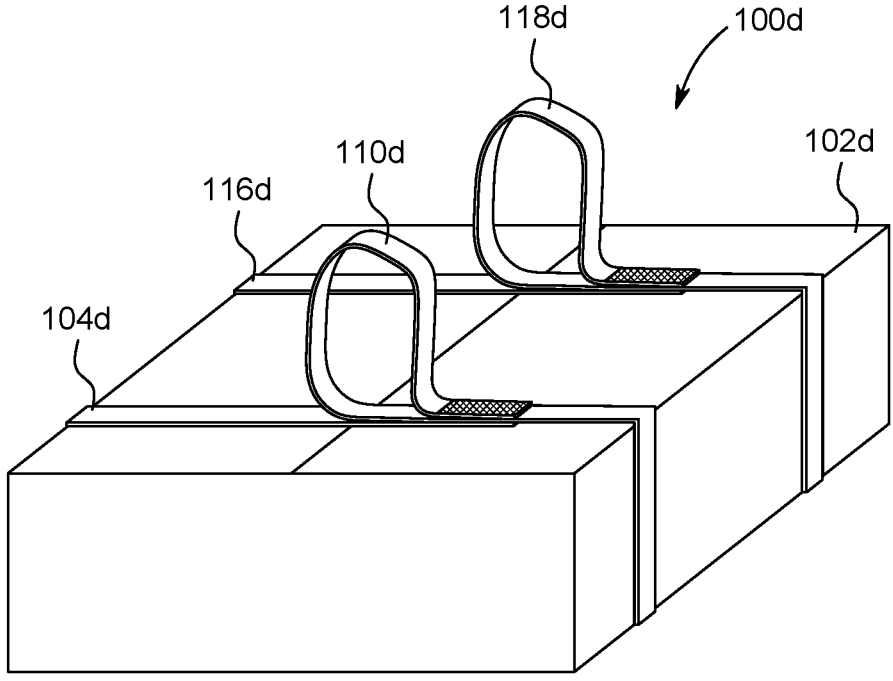
FIG. 5B shows a perspective view of another example embodiment of a device for delivery via an aerial vehicle.

FIGS. 5A and 5B illustrate example embodiments of devices 100*c*, 100*d* for delivery via an aerial vehicle. Namely, both FIGS. 5A and 5B illustrate example embodiments of which include a package 102*c*, 102*d;* a first strap 104*c*, 104*d;* a first loop 110*c*, 110*d;* a second strap 116*c*, 116*d;* and a second loop 118*c*, 118*d*. Including more than one strap, as shown in FIGS. 5A and 5B helps stabilize and balance the package during flight. In these examples, the strap and loops can be formed in any manner as described above. Further, the material, size, and selection of the strap is done in accordance with determining the package characteristics or delivery considerations, as described above.

Figure 6:
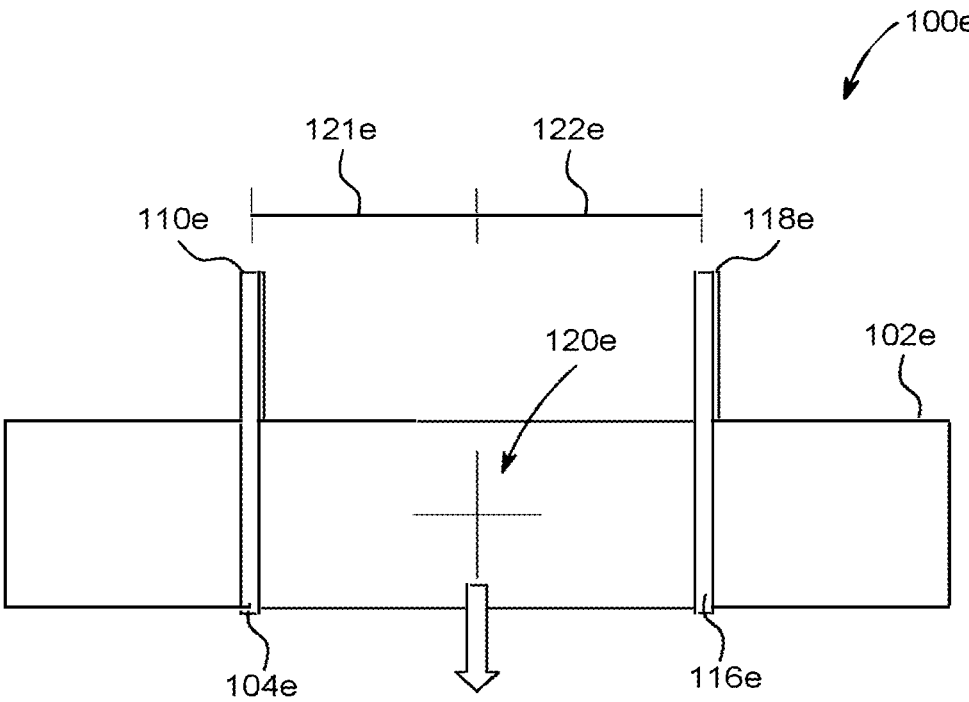
FIG. 6 is a side view of another example embodiment of a device for delivery via an aerial vehicle.

FIG. 6 illustrates side view a device 100*e* for delivery via an aerial vehicle. Similar to the embodiments shown in FIGS. 5A and 5B, the device 100*e* in FIG. 6 includes two straps 104*e*, 116*e* and two loops 110*e*, 118*e*. Both the first strap 104*e* and the second strap 116*e* can be placed to help balance the package and improve stability of the package during flight.

For instance, an operator or automated machine (e.g., strapping device) can determine an approximate center of gravity 120*e* of the package 102*e*. In examples where the package 102*e* has two straps 104*e*, 118*e* and two loops 110*e*, 118*e*, as shown in FIG. 6, the operator or automated machine can align the first strap 104*e* at a first distance 121*e* from the approximate center of gravity 120*e*. The operator or automated machine can align the second strap 116*e* at a second distance 122*e* from the center of gravity 120*e*. To balance the load of the package 102*e*, the first distance 121*e*and the second distance 122*e* are approximately equal to each other. For instance, in an example where a package is 10 inches wide and the center of gravity 120*e* is approximately 5 inches from a first end of the package, the operator or automated machine can align the first strap 104*e* two inches from the center of gravity 120*e* in a first direction. And the operator or automated machine can align the second strap 116*e* two inches from the center of gravity in a second direction, opposite the first direction.

In examples where the package 102*e* has only one strap (e.g., strap 104*e*) and one loop (e.g., loop 110*e*), as shown in FIGS. 1 and 3, the operator or automated machine can align the strap with the center of gravity 120*e* of the package.

In other examples, the operator or automated machine can determine appropriate strap placement based on the width of the package 102*e*. For instance, in example implementations where one strap (e.g., strap 104*e*) is utilized, the strap 104*e* can be placed in the center of the package 120*e*. For example, if the package 102*e* is 20 inches wide, the operator or automated machine can position the strap 104 at approximately 10 inches from one end of the package.

In examples where two straps (e.g., 104*e* and 116*e*) are utilized, the straps 104*e*, 116*e*, can be placed equidistance from the center of the length of the package 102*e*. For example, if the package is 18 inches wide, the operator or automated machine can align the first strap 104*e* approximately 5 inches in a first direction from the center of the length of the package 102*e*. And the operator or automated machine can align the second strap 116*e* approximately 5 inches in a second direction, opposite the first direction, from the center of the length of the package.

Further, in examples where the package 102*e* has two straps, the operator or automated machine can align each strap 104*e*, 116*e* at approximately a third of the distance from the corresponding side of the package. For example, if a package is 18 inches wide, the operator or automated machine can align the first strap 104*e* approximately 6 inches from a first side of the package 102*e*. And the operator or automated machine can align the second strap 116*e* approximately 6 inches from a second side of the package 102*e*, opposite the first side of the package. Many examples of strap placement for load balancing are possible.

In examples, the type or size of strap is predetermined for a package of a certain size or weight. For example, a table can be provided to the operator or automated machine which includes the predetermined type of strap or predetermined size of strap for a corresponding size or weight of the package. As another example, certain types of strap or certain sizes of strap are color coded for use with packages of a certain size or weight.

Other parameters for devices for delivery via an aerial vehicle can be predetermined for a package of a certain size or weight. In examples, the placement of the strap on the package is predetermined for packages of a certain size or weight. For example, a table is provided to the operator or automated machine which includes the predetermined location of the strap or loops of the strap on the package for a corresponding size or weight of the package. In other examples, the number of straps or type of loop (e.g., 110*a* or 110*b*) is predetermined for packages of a certain size or weight. For example, a table is provided to the operator or automated machine which includes the predetermined number of straps or type of loop for a corresponding size or weight of the package.

In other examples, the type of strap, the size of strap, placement of the strap on the package, number of straps, or type of loop, is predetermined for a certain type of contents carried by the package. Information indicating the predetermined type of strap, size of strap, placement on the package, number of straps, or type of loop can be provided on a label of the package and the operator or automated machine can select the type of strap, the size of strap, or placement of the strap on the package based on the information.

Figure 7C:
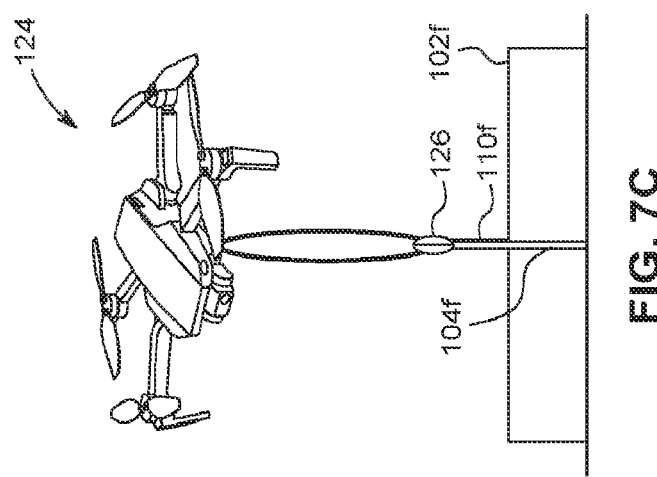
FIG. 7C is a schematic of other aspects of transportation of a device via an aerial vehicle.
Figure 7B:
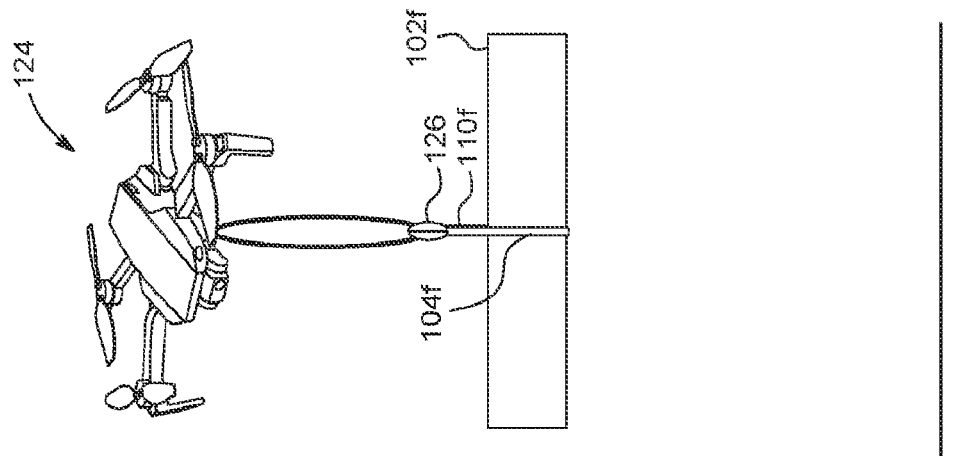
FIG. 7B is a schematic of other aspects of transportation of a device via an aerial vehicle.
Figure 7A:
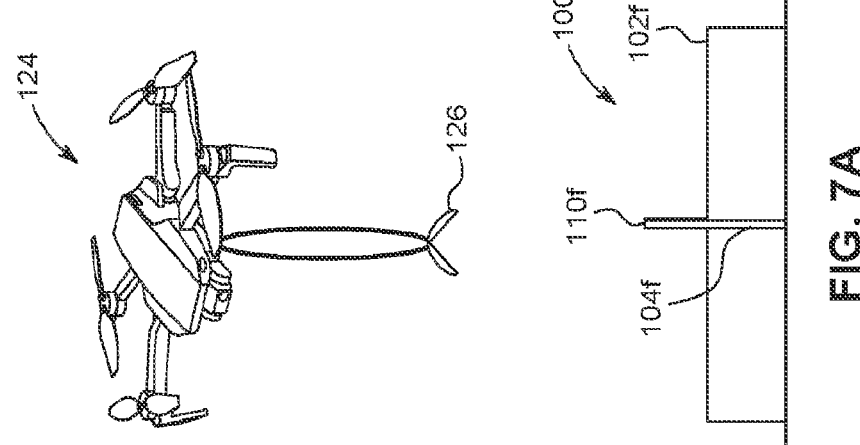
FIG. 7A is a schematic of aspects of transportation of a device via an aerial vehicle.

FIGS. 7A-7C illustrate transportation of a device 100*f* for delivery via an aerial vehicle 124. As described above, the device includes a package 102*f* and a strap 104*f*. The strap 104*f* includes a loop 110*f* engageable by the aerial vehicle 124. In examples, the aerial vehicle 124 is a drone.

In some examples, the aerial vehicle 124 is preprogrammed to complete the steps for acquiring, transporting, and delivering the package 102*f*. Such an aerial vehicle is referred to as an autonomous aerial vehicle. In other examples, the aerial vehicle 124 is remote controlled such that an operator can control the aerial vehicle 124 in real-time. In other examples, the aerial vehicle 124 is preprogrammed to complete at least one of acquiring, transporting, and delivering the package 102*f* and can be remote controlled in real-time. Such an aerial vehicle is referred to as a semi-autonomous aerial vehicle.

The aerial vehicle 124 includes an attacher 126. The attacher 126 can include, for example, a hook, mechanical jaws, a clip, a clamp, or another device which can engage the loop 110*f*. The attacher 126 is suitable to support and lift the package 102*f* via the loop 110*f*.

As shown in FIG. 7A, the aerial vehicle 124 first hovers above the package 102. In examples where the aerial vehicle 124 is controlled in real-time by an operator, the operator can align the attacher 126 with the loop 110*f*. In examples where the aerial vehicle 124 is preprogrammed, the aerial vehicle can include sensors, such as a camera, to align the attacher 126 with the loop 110*f*.

Once the attacher 126 is aligned with the loop 110*f*, the aerial vehicle 124 lowers such that the attacher 126 engages the loop 110*f*. As noted above, the loop 110*f* is shape retaining such that the attacher 126 can engage the loop 110*f* without an operator needing to lift the loop 110*f* or align the loop 110*f* with the aerial vehicle.

In examples where the attacher 126 is a hook, the aerial vehicle 124 engages the loop 110*f* via the hook. In examples where the attacher 126 is a clamp, mechanical jaw, or a clip, the aerial vehicle 124 actuates closure of the attacher once it is aligned with the loop 110*f* to engage the loop 110*f*.

As shown in FIG. 7B, once the aerial vehicle 124 has engaged the loop 110*f*, the aerial vehicle 124 lifts the package 102*f* and transport the package 102*f*. As described above, the strap 104*f* is positioned on the package 102*f* to improve weight distribution and balance of the package 102*f* during flight, reducing the possibility of the strap 104*f* dislodging from the package 102*f* during flight or the aerial vehicle 124 dropping the package 102*f* during flight.

The attacher 126 is suitable to lift and support the package during flight. Different types of attachers 126 have different load barring capacities and security features. As such, the attacher 126 can be selected and utilized based on package characteristics and shipping considerations. For instance, an attacher 126 with a relatively high load barring capacity can be utilized for heavier packages. And an attacher 126 that is more secure, such as mechanical jaws, can be utilized for longer transportation distances or harsher transportation conditions (e.g., severe weather).

As shown in FIG. 7C, once the aerial vehicle 124 has reached the desired destination, the aerial vehicle 124 lowers and releases the package 102*f* onto the ground below. In examples where the attacher 126 is a hook, the aerial vehicle 124 disengages the loop 110*f* by moving the hook away from the loop 110*f*. In examples where the attacher 126 is a clamp, mechanical jaw, or a clip, the aerial vehicle 124 actuates the attacher 126 to disengage the loop 110*f*.

Figure 8:
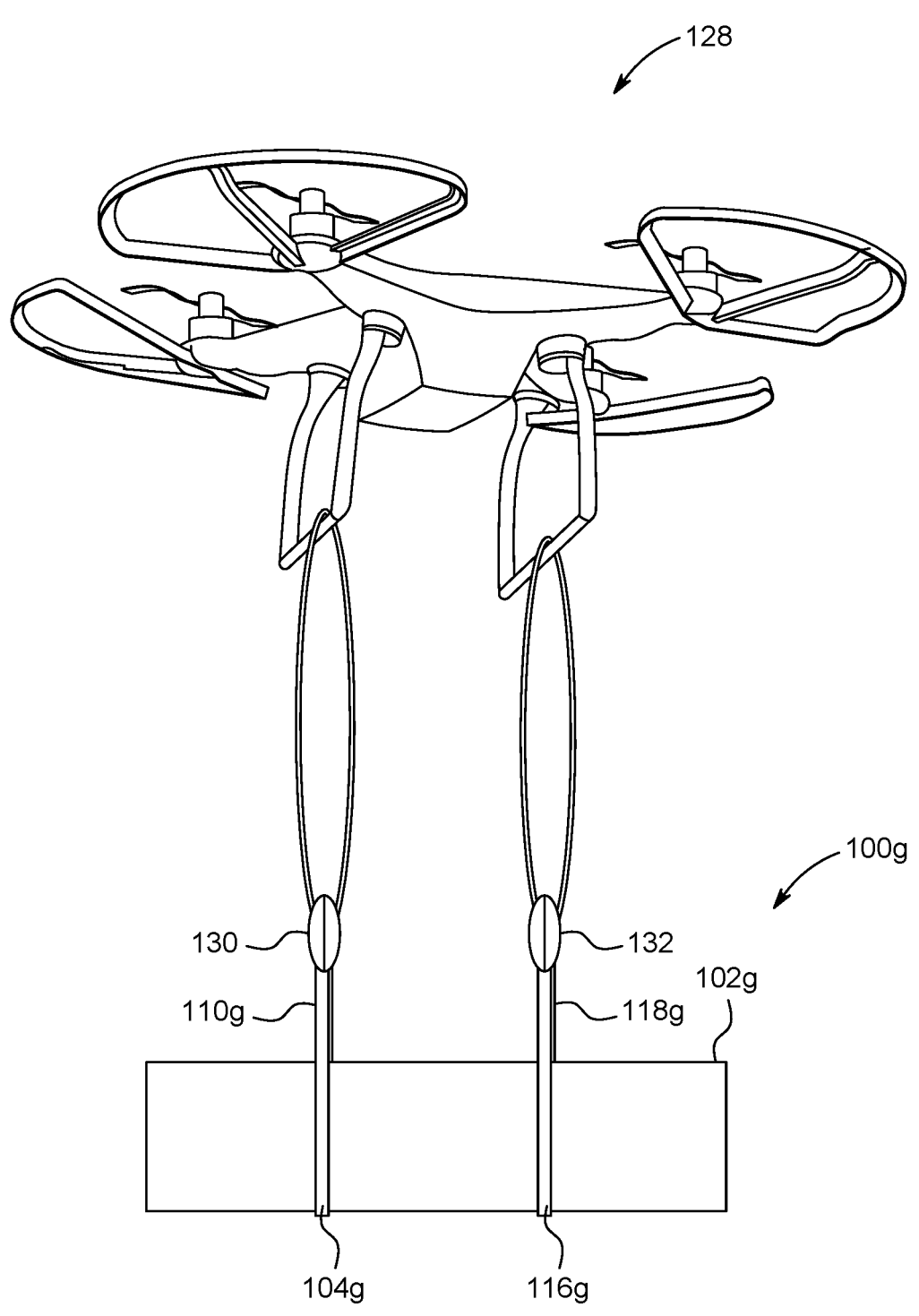
FIG. 8 is a perspective view of aspects of transportation of a device via an aerial vehicle.

FIG. 8 illustrates aspects of transportation of a device 100*g* via an aerial vehicle 124. The package shown in FIG. 8 includes a first strap 104*g*, which includes a first loop 110*g*, and a second strap 116*g*, which includes a second loop 118*g*.

The aerial vehicle 128 includes a first attacher 130 and a second attacher 132. Similar to the attacher shown in FIGS. 6A-6C, the first attacher 130 and second attacher 132 can include, for example, a hook, mechanical jaws, a clip, a clamp, or another device which can engage the first loop 110*g* and second loop 118*g*, respectively. The attachers 130, 132 are suitable to support and lift the package 102*g* via the loops 110*g*, 118*g*.

In examples where one or both of the attachers 130, 132 are hooks, the aerial vehicle 128 can engage the loops 110*g*, 118*g* via the hooks. In examples where one or both of the attachers 130, 132 are a clamp, mechanical jaw, or a clip, the aerial vehicle 128 can actuate closure of the attachers once they is aligned with the loops 110*g*, 118*g*.

As described above, the straps 104*g*, 116*g* are positioned on the package 102*g* to improve weight distribution and balance during flight, reducing the possibility of dropping or dislodging the package from the straps 104*g*, 116*g* and consequently the aerial vehicle 128.

Although example devices for delivery via an aerial vehicle are described above as including one or two straps, in other examples devices for delivery via an aerial include three or more straps. In example devices for delivery via an aerial vehicle with multiple straps, each of the straps has the same material, size, and type of loop. In other example devices for delivery via an aerial with multiple straps, one strap has a different material, size, or type of loop than another strap.

Thus, in various embodiments, the present disclosure provides a method of applying a strap to a package, the method comprising: wrapping the strap around a perimeter of the package so a first portion of the strap engages a side of the package and a second portion of the strap overlaps the first portion of the strap on the side of the package; forming a loop with the second portion of the strap; and attaching part of the second portion of the strap to part of the first portion of the strap to secure the loop so the loop is configured to be engaged by an aerial vehicle so as to lift the package.

In various such embodiments of the method of applying a strap to a package, the part of the first portion of the strap is a first part and wherein the part of the second portion of the strap is a first part, the method further comprising:

attaching a second part of the second portion of the strap to a second part of the first portion of the strap to secure the loop.

In various such embodiments of the method of applying a strap to a package, the first part of the second portion of the strap is attached to the first part of the first portion of the strap at a first attachment area, wherein the second part of the second portion of the strap is attached to the second part of the first portion of the strap at a second attachment area, distinct from the first attachment area, and wherein the loop extends between the first area and the second area.

In various such embodiments of the method of applying a strap to a package, the loop is spaced apart from the first portion of the strap.

In various such embodiments of the method of applying a strap to a package, the length of the loop is greater than the length of the first portion of the strap extending between the first attachment area and the second attachment area.

In various such embodiments of the method of applying a strap to a package, the loop is curved away from the package.

In various such embodiments, the first attachment area includes a first end of the strap and the second attachment area includes a second end of the strap.

In various such embodiments of the method of applying a strap to a package, the method further comprises: determining an approximate center of gravity of the package; and aligning the strap at or near the center of gravity of the package.

In various such embodiments of the method of applying a strap to a package, the strap is a first strap and the loop is a first loop, and the method further comprises: wrapping a second strap around the perimeter of the package so a first portion of the second strap engages the side of the package and a second portion of the second strap overlaps the first portion of the second strap on the side of the package; forming a second loop with the second portion of the second strap; and attaching part of the second portion of the second strap to part of the first portion of the second strap to secure the loop so the loop is configured to be engaged by the aerial vehicle so as to lift the package.

In various such embodiments of the method of applying a strap to a package, the method further comprises determining an approximate center of gravity of the package; aligning the first strap at a first distance from the approximate center of gravity; and aligning the second strap at a second distance from the approximate center of gravity, wherein the first distance and the second distance are substantially the same.

In various such embodiments of the method of applying a strap to a package, attaching the part of the second portion of the strap to the part of the first portion of the strap comprises welding the parts of the first and second portions of the strap together.

In various such embodiments of the method of applying a strap to a package, attaching the part of the second portion of the strap to the part of the first portion of the strap comprises at least one of: forming a set of mechanically interlocking cuts in the parts of the first and second portions of the strap; applying a seal element around the parts of the first and second portions of the strap; or mechanically deforming the parts of the first and second portions of the strap.

In various such embodiments of the method of applying a strap to a package, attaching part of the second portion of the strap to part of the first portion of the strap comprises attaching three overlapping layers of the strap to each other.

In various such embodiments of the method of applying a strap to a package, the second portion of the strap comprises a first part and a second part, wherein forming the loop comprises aligning the first portion, the first part of the second portion, and the second part of the second portion, such that they are overlapping, and wherein attaching the part of the second portion of the strap to the part of the first portion of the strap comprises attaching the first portion, the first part of the second portion, and the second part of the second portion at an attachment area.

In various such embodiments of the method of applying a strap to a package, the first portion of the strap is a first end of the strap and the second part of the second portion is a second end of the strap.

In various such embodiments of the method of applying a strap to a package, the loop is shape retaining.

In various embodiments, the present disclosure provides a method of transporting a package, the method comprising: wrapping a strap around a perimeter of the package so a first portion of the strap engages a side of the package and a second portion of the strap overlaps the first portion of the strap on the side of the package; forming a loop with the second portion of the strap; attaching part of the second portion of the strap to part of the first portion of the strap to secure the loop so the loop is configured to be engaged by an aerial vehicle so as to lift the package; lifting the package, via the loop, with an aerial vehicle; and transporting the package via the aerial vehicle.

In various such embodiments of the method of transporting a package, the part of the first portion of the strap is a first part and wherein the part of the second portion of the strap is a first part, the method further comprising: attaching a second part of the second portion of the strap to a second part of the first portion of the strap to secure the loop.

In various such embodiments of the method of transporting a package, the first part of the second portion of the strap is attached to the first part of the first portion of the strap at a first attachment area, wherein the second part of the second portion of the strap is attached to the second part of the first portion of the strap at a second attachment area, distinct from the first attachment area, and wherein the loop extends between the first area and the second area.

In various embodiments, the present disclosure provides a device for delivery via an aerial vehicle, the device comprising: a package, and a strap comprising a first portion and a second portion, wherein the strap is wrapped around a perimeter of the package so a first portion of the strap engages a side of the package and a second portion of the strap overlaps the first portion of the strap on the side of the package and forms a loop configured to be engaged by the aerial vehicle so as to lift the package.

Various changes and modifications to the above-described embodiments described herein will be apparent to those skilled in the art. These changes and modifications can be made without departing from the spirit and scope of this present subject matter and without diminishing its intended advantages. Not all of the depicted components described in this disclosure may be required, and some implementations may include additional, different, or fewer components from those expressly described in this disclosure. Variations in the arrangement and type of the components; the shapes, sizes, and materials of the components; and the manners of attachment and connections of the components may be made without departing from the spirit or scope of the claims as set forth herein. Also, unless otherwise indicated, any directions referred to herein reflect the orientations of the components shown in the corresponding drawings and do not limit the scope of the present disclosure. This specification is intended to be taken as a whole and interpreted in accordance with the principles of the invention as taught herein and understood by one of ordinary skill in the art.

The invention claimed is:

1. A method of applying a strap to a package, the method comprising:
   wrapping the strap around a perimeter of the package so a first portion of the strap engages a side of the package and a second portion of the strap overlaps the first portion of the strap on the side of the package;
   determining an approximate center of gravity of the package;
   aligning the strap at the center of gravity of the package;
   forming a loop with the second portion of the strap; and
   attaching part of the second portion of the strap to part of the first portion of the strap to secure the loop so the loop is configured to be engaged by an aerial vehicle so as to lift the package.

2. The method of claim 1, wherein the part of the first portion of the strap is a first part and wherein the part of the second portion of the strap is a first part, the method further comprising:
   attaching a second part of the second portion of the strap to a second part of the first portion of the strap to secure the loop.

3. The method of claim 2, wherein the first part of the second portion of the strap is attached to the first part of the first portion of the strap at a first attachment area, wherein the second part of the second portion of the strap is attached to the second part of the first portion of the strap at a second attachment area, distinct from the first attachment area, and wherein the loop extends between the first area and the second area.

4. The method of claim 3, wherein the loop is spaced apart from the first portion of the strap.

5. The method of claim 3, wherein the length of the loop is greater than the length of the first portion of the strap extending between the first attachment area and the second attachment area.

6. The method of claim 1, wherein the loop is curved away from the package.

7. The method of claim 3, wherein the first attachment area includes a first end of the strap and the second attachment area includes a second end of the strap.

8. The method of claim 1, wherein attaching the part of the second portion of the strap to the part of the first portion of the strap comprises welding the parts of the first and second portions of the strap together.

9. The method of claim 1, wherein attaching part of the second portion of the strap to part of the first portion of the strap comprises attaching three overlapping layers of the strap to each other.

10. The method of claim 9, wherein the first portion of the strap is a first end of the strap and the second part of the second portion is a second end of the strap.

11. The method of claim 1, wherein the second portion of the strap comprises a first part and a second part, wherein forming the loop comprises aligning the first portion, the first part of the second portion, and the second part of the second portion, such that the first portion, the first part of the second portion, and the second part of the second portion they are overlapping, and wherein attaching the part of the second portion of the strap to the part of the first portion of the strap comprises attaching the first portion, the first part of the second portion, and the second part of the second portion at an attachment area.

12. The method of claim 1, wherein the loop is shape retaining.

13. A method of applying a first strap and a second strap to a package, the method comprising:
   wrapping the first strap around a perimeter of the package so a first portion of the first strap engages a side of the package and a second portion of the first strap overlaps the first portion of the strap on the side of the package;
   determining an approximate center of gravity of the package;
   aligning the first strap at a first distance from the approximate center of gravity;
   forming a first loop with the second portion of the first strap;
   attaching part of the second portion of the first strap to part of the first portion of the first strap to secure the first loop so the first loop is configured to be engaged by an aerial vehicle so as to lift the package;
   wrapping the second strap around the perimeter of the package so a first portion of the second strap engages the side of the package and a second portion of the second strap overlaps the first portion of the second strap on the side of the package;
   aligning the second strap at a second distance from the approximate center of gravity, wherein the first distance and the second distance are substantially the same;
   forming a second loop with the second portion of the second strap; and
   attaching part of the second portion of the second strap to part of the first portion of the second strap to secure the second loop so the second loop is configured to be engaged by the aerial vehicle so as to lift the package.

14. A method of transporting a package, the method comprising:
   wrapping a strap around a perimeter of the package so a first portion of the strap engages a side of the package and a second portion of the strap overlaps the first portion of the strap on the side of the package;
   determining an approximate center of gravity of the package;
   aligning the strap at or near the center of gravity of the package;
   forming a loop with the second portion of the strap;
   attaching part of the second portion of the strap to part of the first portion of the strap to secure the loop so the loop is configured to be engaged by an aerial vehicle so as to lift the package;
   lifting the package, via the loop, with the aerial vehicle; and
   transporting the package via the aerial vehicle.

15. The method of claim 14, wherein the part of the first portion of the strap is a first part and wherein the part of the second portion of the strap is a first part, the method further comprising:
   attaching a second part of the second portion of the strap to a second part of the first portion of the strap to secure the loop.

16. The method of claim 15, wherein the first part of the second portion of the strap is attached to the first part of the first portion of the strap at a first attachment area, wherein the second part of the second portion of the strap is attached to the second part of the first portion of the strap at a second attachment area, distinct from the first attachment area, and wherein the loop extends between the first area and the second area.

* * * * *